March 7, 1933.  L. FRANK  1,900,491

VEGETABLE SLICING MECHANISM

Filed Dec. 17, 1930  3 Sheets-Sheet 1

Inventor
Leonard Frank

By

Attorney

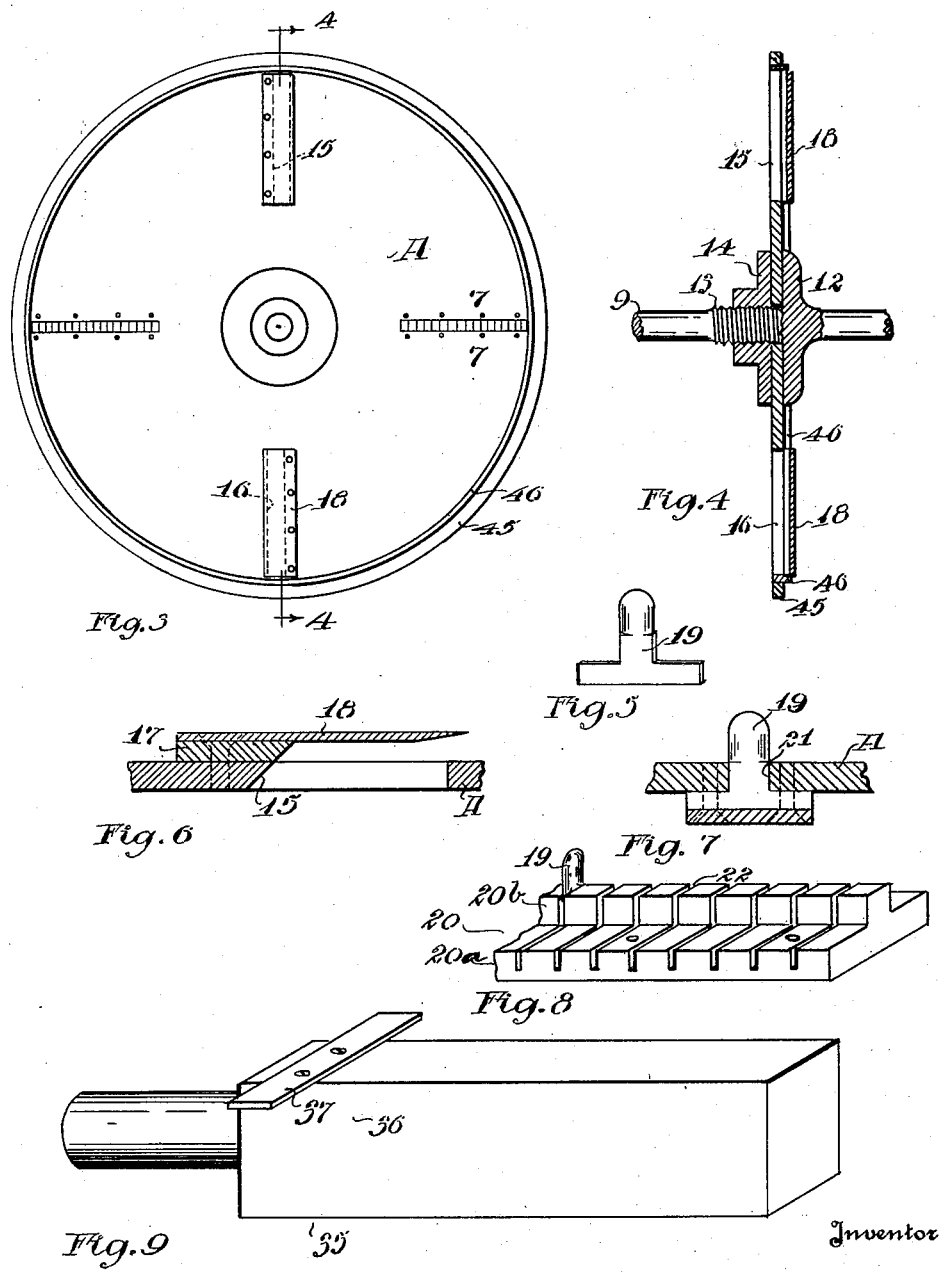

March 7, 1933.  L. FRANK  1,900,491

VEGETABLE SLICING MECHANISM

Filed Dec. 17, 1930  3 Sheets-Sheet 3

Inventor
Leonard Frank
By N. D. Johnson
Attorney

Patented Mar. 7, 1933

1,900,491

UNITED STATES PATENT OFFICE

LEONARD FRANK, OF ST. PAUL, MINNESOTA

VEGETABLE SLICING MECHANISM

Application filed December 17, 1930. Serial No. 502,962.

The present invention relates to a vegetable slicing mechanism, and more particularly to a mechanism which is adapted to cut vegetables into long, slender strips for frying.

In the making of what are ordinarily referred to as "shoestring" potatoes, the potatoes are first cut into long, narrow strips, and are then fried in deep fat until brown and crisp. These cooked potatoes are frequently packed in bags and sold in stores for lunches and home use. It is desirable, in making these potatoes for sale in this manner, that the strips be of as uniform size as possible and that they be cooked to retain their freshness and crispness as long as possible.

An object of the present invention is to make a mechanism for cutting potatoes into long, narrow strips, rapidly, and with a minimum of waste.

A further object of the invention is to cut potatoes, and other vegetables, into long, narrow strips with a slit lengthwise thereof, partially through the strip.

These and other features of the invention will be more fully brought out in the following description and the accompanying drawings, wherein:

Figure 3 is a side view of a wheel carrying cutting and slicing blades.

Figure 4 is a sectional view on the line 4—4 of Figure 3.

Figure 5 is a view in perspective of a slitting blade.

Figure 6 is an enlarged sectional view of a slicing blade, showing said blade mounted over an aperture in the disk illustrated in detail in Figures 3 and 4.

Figure 7 is an enlarged sectional view on the line 7—7 of Figure 3.

Figure 8 is a view in perspective of a portion of a transversely slotted bar for holding the slitting blades, one of the blades being shown in position therein.

Figure 9 is a view in perspective of a device for pushing vegetables forward in the feedway so as to avoid danger of cutting an operator's hands.

Figure 1:
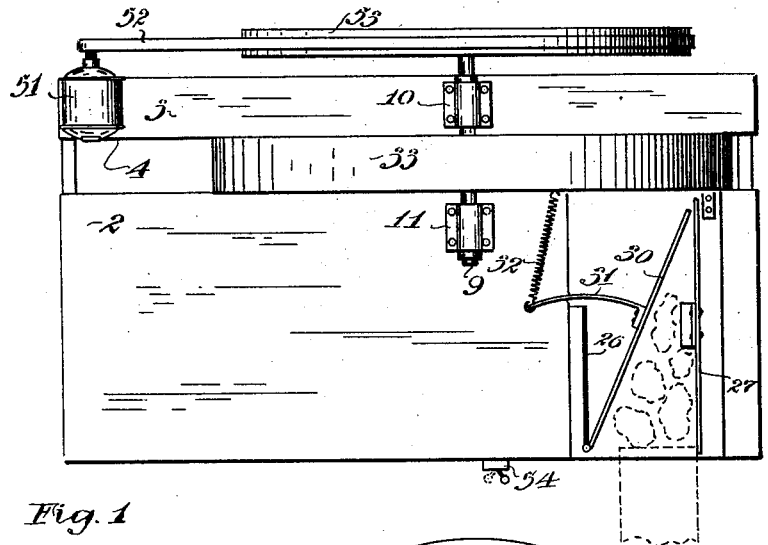
Figure 1 is a plan view of a mechanism embodying the present invention.
Figure 2:
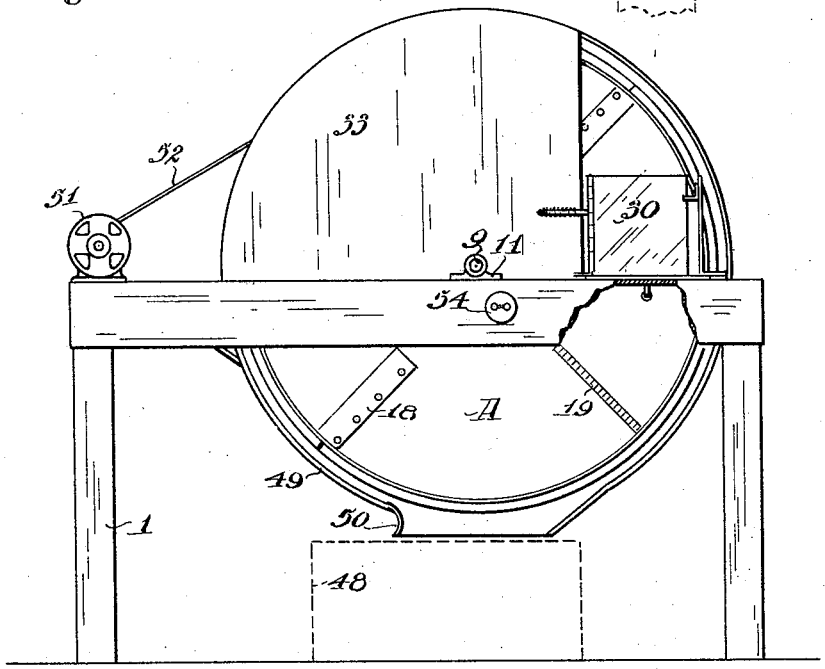
Figure 2 is a view in side elevation of the mechanism illustrated in Figure 1, a portion of a side thereof being broken away to more clearly illustrate the mounting of a feedway.

Referring to the drawings in detail, a supporting structure for the device has four legs 1 with a sheet metal top portion which is preferably made in two parts 2 and 3 with a space 4 therebetween in which is mounted a disk A. The disk is mounted on a shaft 9 journaled in bearings 10 and 11. The shaft 9 has a flange 12 integral therewith, and has a slightly enlarged threaded portion 13 upon which is threadedly mounted a flanged collar 14 to engage the disk and hold it firmly against relative rotation with respect to the shaft 9. A pair of rectangular openings 15 and 16 are provided in diametrically opposed position in the disk A. Across the rear edge of each of these openings, with respect to the normal direction of rotation of the disk in operation thereof, is mounted a blade support 17 and upon each of these blade supports is fixedly secured a slicing blade 18, with its sharpened forward edge extending forwardly over the opening.

Ninety degrees from the blades 18 are mounted two rows of slitting blades 19. These blades are mounted in blade holders 20 having a wide lower portion 20a and a reduced upper portion 20b of a size to fit closely into an elongated opening 21 in the disk A and to lie flush with the face of said disk. The blade supporting members are slotted transversely as at 22, the slots being of uniform depth and spaced apart the width of the strips of vegetables it is desired to cut with the mechanism.

A blade 19 is provided for each of the slots, the blades being made with a narrow upper portion of the width of the reduced upper portion 20b of the blade support member 20, and a wide, lower portion of a size to fit into the slot in the widened lower portion of the blade support member. The blades project above the blade supports when mounted therein about one and one-half times the distance between adjacent blades. The upper portions of the blades 19 being of the same width as the opening 21, are held against lateral displacement by the sides of the opening. The blade support is secured to the disk A as by means of screws 23 to hold the wide base portions of the blades securely against the disk.

Figure 11:
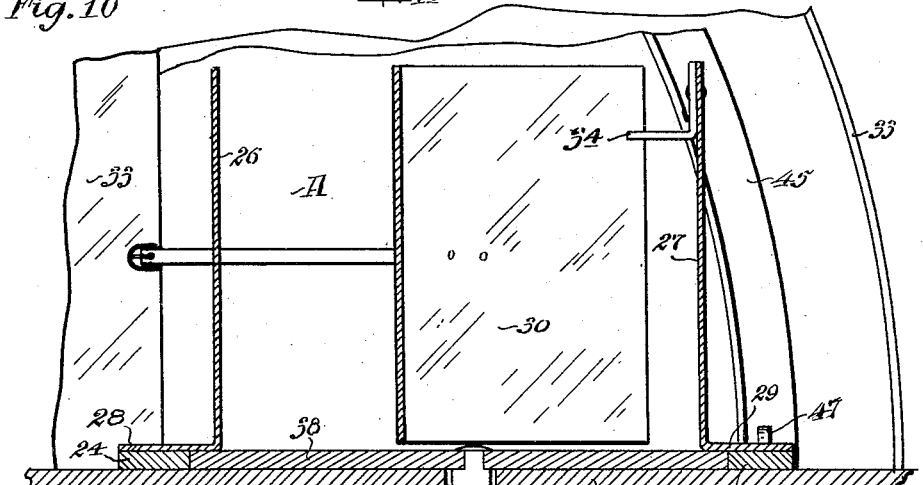
Figure 11 is a sectional view on the line 11—11 of Figure 10.

A feedway for the feeding of vegetables to the slitting and slicing knives comprises a pair of metal strips 24 and 25, see Figure 11, upon which are mounted side members 26 and 27, respectively, these side members having outwardly turned lower portions 28 and 29, which are sligthly wider than the strips 24 and 25 so as to extend inwardly therefrom when the sides are mounted on the strips. The side member 26 is shorter than the side member 27 and on the rear end of the side 26 is hingedly connected a plate 30 of approximately the same length as the side 26. A curved arm 31 is mounted on the outer side of the plate 30 and to the outer end of this arm is connected a spring 32, the forward end of this spring being connected as to a safety guard 33 mounted over the disk A. This spring resiliently urges the plate 30 to the right, as shown in Figure 1, and holds vegetables in a compact group for feeding to the blades on the disk.

A strip of angle iron 34 may be mounted on the inner side of the side member 27 to hold a pusher 35 against upward displacement. This pusher may comprise a rectangular forward portion 36 of slightly more than one-half the width of the feedway, as illustrated in dotted lines in Figure 1, and is provided with a transverse stop bar 37 to engage the rear edges of the side members 26 and 27 to prevent the pusher from accidentally being moved far enough forward in the feedway to come within range of the blades on the rotating disk, when pushing the vegetables in the feedway forward against the rotating disk.

A base plate 38 is slidably mounted beneath the overhanging inner portions of the bases 28 and 29 of the side members and is of a width to have a sliding fit between the strips 24 and 25. This plate rests on the surface of the top 2 of the supporting table, in which is cut a slotted opening 39. A downwardly projecting arm 40 is secured to the slidable base plate 38, to the lower end of which arm is connected a spring 41. The forward end of this spring is connected to the lower side of the top 2, as by means of a rivet 42 to resiliently urge the plate 38 forwardly toward the disk A. The forward edge of the plate is denticulated as at 43, the teeth being spaced apart to receive the slitting blades 19 therebetween.

Connected to a side of the forward edge of the plate 38 is a roller support 44, in which is mounted a roller 47. This roller rides on a cam ring 45 fixedly mounted to extend entirely around the periphery of the disk A, and a thin metal strip 46 is mounted between the cam 45 and the disk. This intermediate strip 46 projects upwardly above the face of the disk A, as illustrated in Figures 4 and 10, to hold strips of vegetables, cut by the mechanism, against outward displacement.

Figure 10:
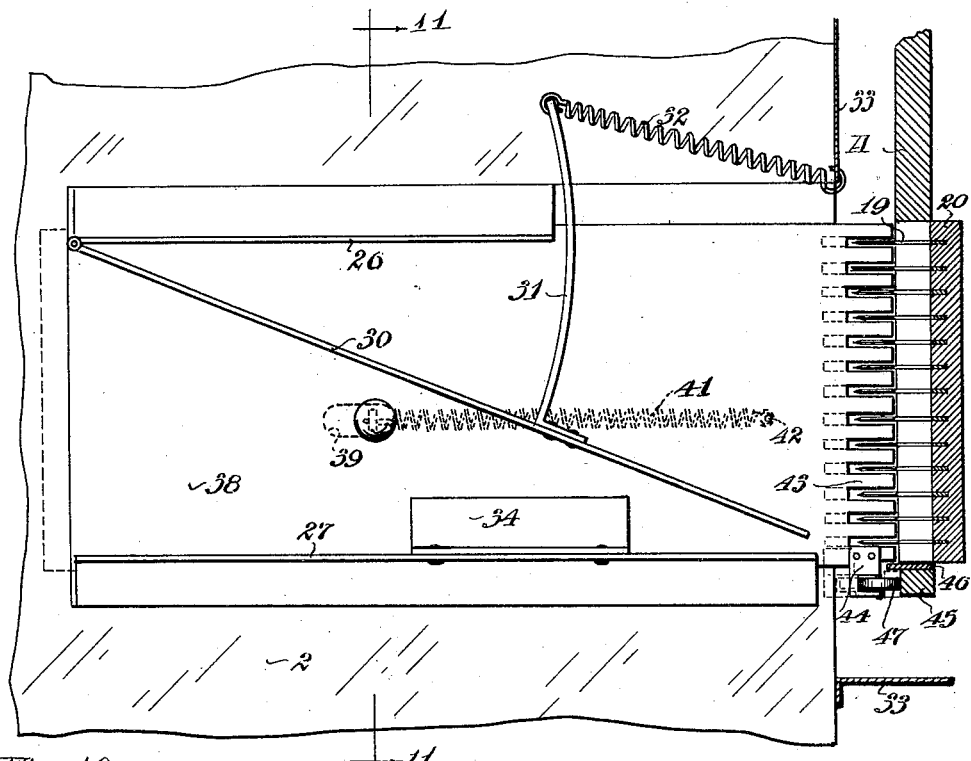
Figure 10 is an enlarged view in top elevation of the feedway and a portion of the disk bearing the slicing and slitting blades.

The cam ring 45 is on a level with the face of the disk A from the slicing blades 18 to the slitting blades 19 in the direction of rotation, so that the roller 47 will permit the spring 41 to draw the plate 38 to the forward solid line position illustrated in Figure 10, as the slitting knives 19 pass the feedway. The teeth 43 of the plate 38 extend forwardly almost to the disk A and thus keep the spaces between the slitting knives clean for effective operation. The surface of the cam ring 45 gradually rises from the slitting blades to the slicing blades in the direction of rotation so that as the slicing blades approach the plate 38, the roller 47, riding on the cam 45, will force the plate 38 rearwardly to prevent the slicing blade from striking the denticulated forward edge of the plate 38 and to permit the strips severed from the vegetables to be carried downward. As the strips are severed by the slicing blades they are forced through the openings 15 in the disk A, and fall downwardly into a receptacle 48 placed to receive them. A sheet metal guard 49 is positioned over the lower portion of the disk A, the lower portion of the guard being formed into a spout as at 50 to guide the severed strips into the receptacle.

A driving motor 51 is mounted on the portion 3 of the top of the supporting table and drives a belt 52 which in turn drives a pulley 53 fixedly secured to the shaft A.

In operation, the disk is rotated by means of the motor which may be controlled by an electric switch 54, and a quantity of vegetables, such as potatoes, are placed in the feedway. These vegetables are pushed forward against the disk as by means of the pusher 35.

Figure 12:
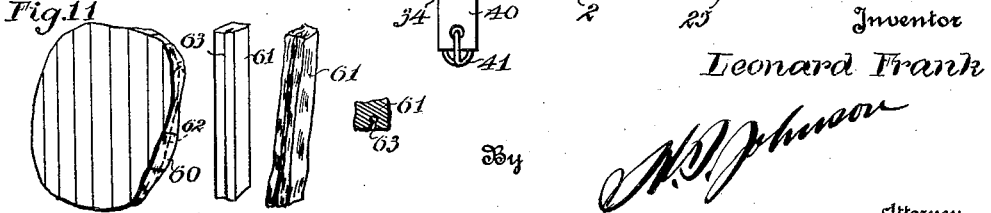
Figure 12 shows, respectively, from left to right, a portion of a potato after being cut with the slitting blades; a strip cut from the potato; the same strip after frying, and a sectional view of the fried strip.

The slitting blades slit the vegetables 60, the lower plate 38 of the feedway being in a forward position, as illustrated in Figure 10, and the following slicing blade severs the strips 61 on the plane indicated by the dotted line 62 in the left hand view in Figure 12. The slicing blade has its edge spaced outwardly from the surface of the disk a distance substantially equal to the space between adjacent slitting blades so as to cut a square strip. Since, as previously pointed out, the slitting blades extend out from the surface of the disk a greater distance than the space between blades, it is apparent that the slitting blades will slit the vegetable 60 to a greater depth than the slicing blade will remove. After severing a layer of strips, therefore, the surface of the vegetable will still be slitted to a depth equal to about half the thickness of a strip, as at 63.

Each time the slicing blade slices off a layer of strips, the vegetable is moved slightly from the impact and is also moved as it advances into engagement with the surface of the disk after the slicing blade moves past. The next slitting blades again slit the vegetable, but, due to the moving of the vegetable as above pointed out, the slitting blades do not enter the slits from the previous slitting operation, so that when the strips are severed they are slit partially through lengthwise thereof. When these strips are cooked, as by frying in deep fat, the fat penetrates into the slits thus formed, and sufficient heat reaches the centers of the strips to cook them.

Before the use of this mechanism the strips were cut square with no lengthwise slits, and the strips were not cooked as thoroughly at their centers as was desirable with the result that packages of the cooked strips offered for sale in stores would sometimes sour at their centers before they were sold. Strips cut on the present mechanism are much crisper when cooked than the old, unslitted strips, and keep fresh much longer, due to this more thorough cooking throughout.

I claim:

1. A vegetable cutting mechanism of the character described, comprising a supporting frame, a disk rotatably mounted thereon, a plurality of laterally aligned, equally spaced slitting blades mounted to extend above the surface of said disk, a slicing blade mounted on said disk and spaced outwardly from the face thereof a distance not greater than the length of said slitting blades above the face of said disk, a feedway mounted laterally adjacent said disk, a slidable bottom plate mounted in said feedway, said bottom plate having a toothed forward edge, the teeth thereof being disposed to lie normally between the paths of the slitting blades, and cam means operatively connected to said disk to slidably move said bottom plate rearwardly beyond the path of said slicing blade as said slicing blade passes said feedway.

2. A vegetable cutting mechanism of the character described, comprising a supporting frame, a rotatable member mounted thereon, a plurality of laterally aligned slitting blades mounted on said rotatable member to rotate in a plane about the axis of rotation of said rotatable member, a slicing blade mounted on said rotatable member to have the slicing edge thereof rotate in a plane offset outwardly from the plane of rotation of said slitting blades at their bases, a feedway mounted laterally adjacent the planes of rotation of said slitting and slicing blades, a bottom plate slidably mounted in said feedway, said plate having a plurality of teeth extending forwardly therefrom to normally lie between the paths of the slitting blades, and cam means operatively connected to said rotatable member to move said plate rearwardly beyond the plane of rotation of said slicing blades during the passage of said slicing blade past said feedway.

3. A vegetable cutter, comprising a supporting frame, a rotatable member mounted thereon, said rotatable member having an opening therein, a plurality of laterally aligned slitting knives carried by said rotatable member, a slicing blade mounted over said opening, a feedway mounted laterally adjacent the paths of said blades on said rotatable member, a slidable bottom plate mounted in said feedway, said bottom plate having a plurality of teeth extending forwardly between said slitting knives, and cam means operatively associated with said slidable plate to move said slidable plate rearwardly beyond said slicing blade during the travel of said slicing blade past said feedway.

4. A vegetable cutter, comprising a rotatable member, slitting and slicing blades carried by said rotatable member to move in coincident paths about the axis of said rotatable member, a feedway mounted laterally adjacent the paths of said slitting and slicing blades, said feedway comprising a pair of side walls, a slidable plate mounted on the bottom of said feedway, said slidable plate having portions thereof projecting forwardly between the paths of said slicing blades, and cam means mounted to move said slidable plate rearwardly beyond the path of said slicing blade as said slicing blade passes said feedway.

5. A vegetable cutter, comprising a rotatable member having slitting and slicing blades carried thereby to move in concentric paths about the axis of said rotatable member, a flange on said rotatable member mounted to extend above the face of said rotatable member and positioned radially outward beyond said slitting knives to prevent outward displacement of a portion of a vegetable slit by said slitting knives, a feedway mounted laterally adjacent the paths of said slitting and slicing blades during a rotation of said rotatable member, said feedway having a slidable bottom plate, a plurality of projections extending forwardly from the forward end of said slidable plate into the spaces between said slitting blades, and cam means mounted to move said slidable plate rearwardly beyond the path of movement of said slicing blade, as said slicing blade approaches said feedway.

In testimony whereof I affix my signature.

LEONARD FRANK.